March 4, 1952   J. LAST   2,588,017
TORQUE TRANSMITTING DEVICE
Filed Sept. 5, 1945
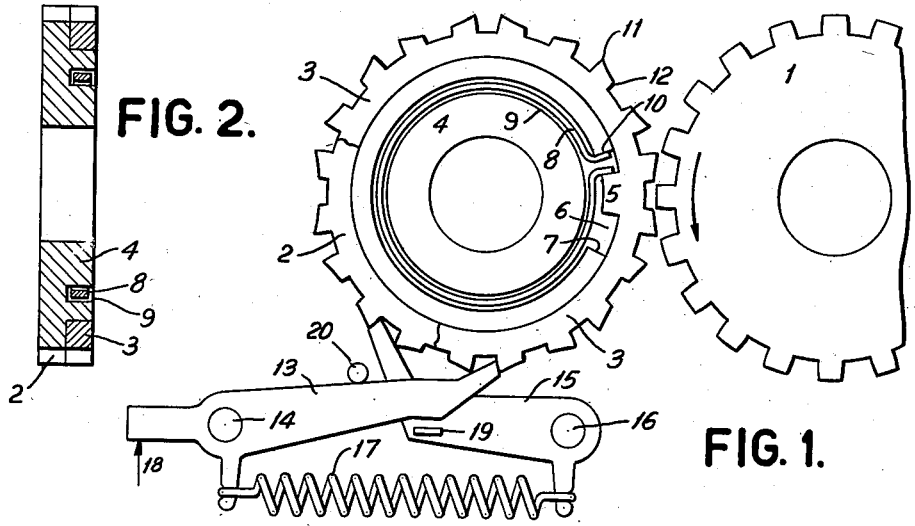
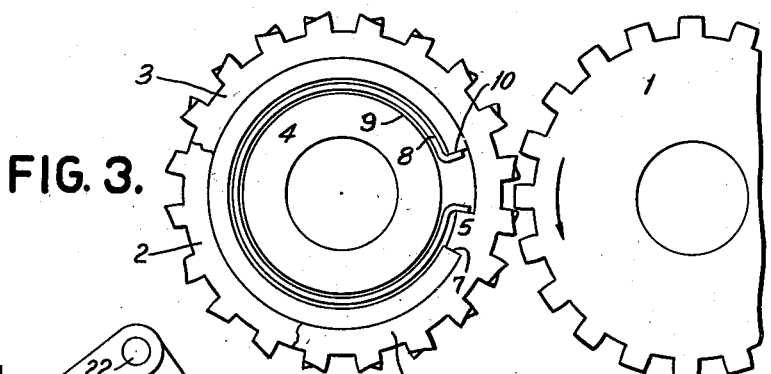
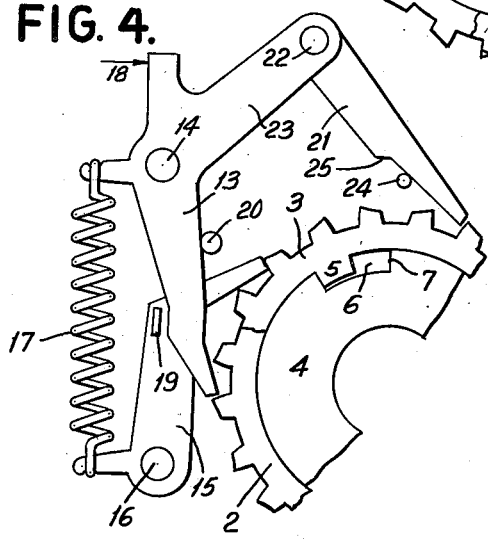
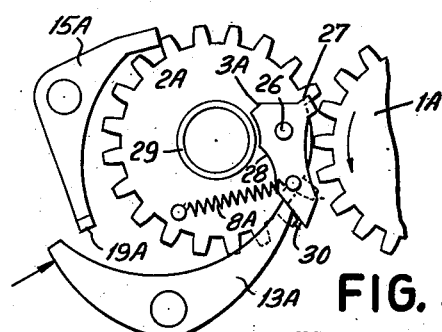
INVENTOR
JAMES LAST
BY
*W. M. Wilson*
ATTORNEY

UNITED STATES PATENT OFFICE 2,588,017

TORQUE TRANSMITTING DEVICE

James Last, London, England, assignor to International Business Machines Corporation, New York, N. Y., a corporation of New York Application September 5, 1945, Serial No. 614,486
In Great Britain February 26, 1945

13 Claims. (Cl. 74—414)

This invention relates to torque transmitting means.

An object of the invention is to provide a torque transmitting means in which the over-all thickness of the operating parts is a minimum.

An object of the invention is to provide a torque transmitting means in which a driven member includes a driven gear with teeth normally clear of a driving gear and in which the driven member further includes an auxiliary toothed element which is also normally clear of the driving gear but movable to a drive-receiving position to engage with, and thereafter enable the driven gear to be engaged for drive by, the driving gear.

An object of the invention is to provide a torque transmitting means in which the driving member is in the form of a gear wheel and the driven member in the form of a composite gear the teeth of which are clear of the driving gear in the drive-interrupting position of the composite gear and the teeth of which are movable relatively to each other to bring them into engaging and drive-receiving position with the driving gear.

An object of the invention is to provide a torque transmitting means in which the driving member is in the form of a gear and the driven member is a composite gear having relatively movable teeth which in one relative position are clear of and demeshed from the driving gear and in a different relative position are engaged with and meshed with to the driving gear.

The torque transmitting means, according to the invention may be adapted to engage and disengage in any one of a plurality of angular positions or may be a one-revolution gearing in which the driven member, when engaged makes a single revolution and is then disengaged.

According to one form of the invention, the driving member is in the form of a gear wheel having teeth of approximately ordinary form and the driven member includes a primary wheel in the form of a toothed wheel having teeth differing from ordinary teeth in being cut away and radially shortened at certain portions so that in certain angular positions of the primary wheel, its teeth are just clear of the teeth of the driving wheel, but engage with them in other positions. The driven member further includes an auxiliary toothed element attached to the primary wheel and pivotally movable relative thereto from a drive-interrupting to a drive-receiving position, the auxiliary element being free of the teeth of the driving wheel in the drive-interrupting position, but in the drive-receiving position presenting a tooth adapted to engage with the driving wheel in those positions of the primary wheel in which the teeth of the primary wheel are clear of the teeth of the driving wheel. Means are provided for moving the auxiliary toothed element relatively to the primary wheel. The auxiliary element may be a gear wheel mounted concentrically with the primary wheel, of equal diameter, and having teeth similar to those of the primary wheel, the teeth of one or the other of the two wheels, when the auxiliary element is in drive-receiving position, engaging with the teeth of the drivng wheel. A sprng may be provided between the primary wheel and the auxiliary element tending to turn the element into the drive-receiving position. Alternatively, positive means to move the auxiliary element to drive-receiving position may be provided. A check detent is provided adapted to engage the primary wheel to prevent its turning in the sense of the driving wheel and also an auxiliary detent adapted to engage the auxiliary element to prevent its turning in the opposite sense, the two detents being so located that, when engaging the primary wheel and auxiliary element, they hold both of them in a position in which they are free of the driving wheel. The movement of the auxiliary detent to disengage the auxiliary element preferably also moves the check detent to disengage the primary wheel, but only after the auxiliary element has been disengaged. By making the auxiliary element in the form of a ring, mounting the ring on a hub projecting from the primary wheel, and confining the spring for moving the ring to drive-receiving position in a sink in the hub, the operative parts of the torque transmitting means are contained within a space not thicker than the combined thickness of the primary wheel and auxiliary member. The teeth of the primary wheel and auxiliary ring are preferably cut away from a point above the pitch line on one side to a point below the pitch line on the other side of each tooth, the inclination of the tops of the teeth being oppositely directed in successive teeth of the primary wheel or ring.

In a modification, embodying a one-revolution gearing assembly, the primary gear may have conventional teeth; the primary wheel may be clear of the teeth of the driven wheel in one position only, while the auxiliary toothed element, when moved to drive-receiving position, may present a tooth adapted to engage with the teeth of the driving wheel.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a side view of the driving and driven members, of the main embodiment, in the drive-interrupting position.

Fig. 2 is a central vertical section through the driven member.

Fig. 3 is a view similar to that of Fig. 1 with the driven member in drive-receiving position, and with the detents omitted.

Fig. 4 is a side view of a part of the driven member showing an alternative way of moving the auxiliary member into drive-receiving position.

Fig. 5 is a side view showing the arrangement which may be used for a one-revolution gearing assembly.

The main embodiment is shown in Figs 1 to 3. It comprises a driving member 1 which is a gear turning in the direction of the arrow and provided with teeth of ordinary form but with addendum somewhat shorter than usual. The driven member comprises a primary gear wheel 2 and an auxiliary gear in the form of a ring 3 mounted on a hub 4 projecting from the gear 2. A lug 5 on ring 3 enters a recess 6 in hub 4 and permits the ring to turn clockwise on the hub until the lug engages an end wall 7 of the recess. A spring 8 in a circular channel in hub 4 has one end bearing against lug 5 and its other end against the end wall 10 of recess 6. The spring therefore tends to turn the ring 3 from its Fig. 1 position to its Fig. 3 position. The Fig. 1 position is the drive-interrupting or disengaged position while the Fig. 3 position is the drive-receiving or engaging position.

The gear 2 and ring 3 are equal in diameter and have identical teeth. There is an even, same number of teeth on gear 2 and on ring 3, affording an integral number of adjacent teeth pairs on each. Each such pair has the tops of its teeth disked to an arc concentric with the addendum circle of the driving gear 1 when the pair of teeth directly faces the driving gear, as is understood from Fig. 1. Each tooth, therefore, is cut away from one top corner 11 which is above the pitch line to the other top corner 12 which is below the pitch line. It is clear that the tops of alternate teeth are inclined in corresponding directions opposite to the directions of inclination of the tops of the interspersed teeth. In the drive-interrupting position (Fig. 1), the teeth of ring 3 and gear 2 are in alinement and clear of the teeth of the driving wheel. As illustrative, there are ten pairs of teeth on ring 3 and ten similar pairs on gear 2; hence, there are ten possible angular positions, similar to the one shown in Fig. 1, in which the ring 3 and gear 2 are demeshed from the driving gear 1.

The ring 3 and gear 2, in effect, constitute a composite gear. Ring 3, in moving from a drive-interrupting position, such as in Fig. 1, to a drive-receiving position, as in Fig. 3, turns through the pitch of the teeth, and then each tooth of the composite gear has an addendum on both sides, the addendum on one side being the long side of a tooth of the ring 3 and the addendum on the other side being the long side of a tooth of gear 2.

The composite gear then has teeth which engage with those of driving gear 1, which therefore rotates the composite gear. The thickness of the driving gear is preferably equal to that of the composite gear. It may be noted that in the drive-receiving condition of the composite gear, it is driven by the engagement of gear 1 with teeth alternately of ring 3 and gear 2. In other words, elements 2 and 3 each have drivable teeth at twice the pitch distance so that in their relative position shown in Fig. 1, where their drivable teeth are aligned, they provide a composite set of drivable teeth at twice the pitch distance and removed from the driving range of gear 1. In the engaged position shown in Fig. 3, the element 3 has been angularly displaced to intersperse its drivable teeth with the drivable teeth of element 2, whereby a composite set of drivable teeth is formed at pitch distance spacing and in substantially conventional mesh with gear 1 to be driven thereby. Ring 3 when being driven by gear 1 transmits drive to gear 2 by the positive engagement of lug 5 with wall 7, while gear 2 when driven by gear 1 transmits drive to the ring by means of spring 8.

In drive-interrupting position, a detent 13, pivoted at 14, engages a tooth of the ring 3 to prevent its turning clockwise, and a check detent 15, pivoted at 16, engages a tooth of the primary gear 2 to prevent its turning counterclockwise, or in the sense of the driving gear 1. These two detents hold the ring 3, against the pressure of spring 8, in the drive-interrupting position and hold the composite gear, 2—3, in drive-interrupting position. A spring 17 urges the detents to their engaging positions.

To engage the drive, detent 13 is turned in the direction of arrow 18 to free the ring 3. As, or just before, the ring is freed, detent 13 strikes a lug 19 on the detent 15 and rocks it counterclockwise to release it from primary gear 2. Ring 3 is freed before gear 2 and thereupon is turned by spring 8 into a drive-receiving position, such as shown in Fig. 3. Upon gear 2 also being freed, the composite gear 2—3 is driven by the driving gear 1.

To change the composite gear to the drive-interrupting position, detent 13 is allowed to return to the latching position. It intercepts a tooth of ring 3, arresting the ring while the primary gear 2 continues to be driven by gear 1 until it is in the position, relative to the ring, which is shown in Fig. 1. A stop 20 limits the upper position of detent 13 so that the detent can engage only with the long side of a tooth on the ring. Upon such engagement, the ring 3 is in a position in which a pair of adjacent teeth is clear of and directly facing the gear 1, as shown in Fig. 1. When the gear 2, upon its continued movement by gear 1, following the arrest of ring 3, reaches the position in which its teeth are in alinement with the teeth of the ring 3, then the detent 15 snaps behind the long side of a tooth on the gear 2. Both the gear 2 and the ring 3 then are out of engagement with the driving gear.

Preferably, the teeth of the ring 3 are cut away near the edge 12 a little more than the arcual cut, relative to the center of the driving wheel, to avoid a possible jam during engagement with the teeth of the driving wheel.

The spring 8 may be replaced by means for giving a positive movement to the ring 3, as shown in Fig. 4. A pawl 21 is pivoted at 22 to an arm 23 of the detent 13, and is adapted to bear against a tooth of the ring 3. When the detent 13 is turned to engage the drive, the pawl 21 turns the ring 3 relatively to the primary wheel 2. A stop 24 bears against the incline 25 to lift the pawl clear of the teeth when the drive is engaged.

In the above described form of torque-transmitting means, it will be seen that all the opertaive parts of the assembly are confined within a thickness equal to the combined thickness of the primary wheel 2 and ring 3. The assembly, therefore, can be constructed to occupy a space in thickness less than any other known form of demeshable gearing.

Fig. 5 shows a modified form of torque transmitting means adapted to a one-revolution gearing assembly. The teeth of the driving wheel 1A and the primary wheel 2A may be of ordinary form, but two teeth of the wheel 2A are cut away so that the wheel 2A is clear of the driving wheel when the assembly is in its single drive-interrupting position. The auxiliary toothed member 3A is pivoted to the wheel 2A at 26 and has a single tooth 27 which, in the drive-interrupting position shown, is clear of the teeth of the driving wheel. The spring 8A tends to move the member 3A clockwise into a position in which its tooth 27 replaces the upper missing tooth of the wheel 2, this position of member 3A being determined by engagement of the portion 28 of the member 3A with a sleeve 29 of the wheel 2A.

The member 3A is held in the drive-interrupting position shown by the detent 13A bearing against a portion 30 of the member 3A. The detent 13A, when moved clear, or nearly clear, of the member 3A strikes the lug 19A on the detent 15A to move it clear of the teeth of the primary wheel 2A. The detent 13A is returned to the position shown before the primary wheel has completed its revolution, and the auxiliary member 3A is restored to drive-interrupting position by striking the detent 13.

Alternatively, the auxiliary member 3A may be a ring mounted as ring 3 in Fig. 1 with a single tooth which, in drive-interrupting position, is superposed on the first tooth on wheel 2 above the space of missing teeth.

The spring 8 in the arrangement of Fig. 1 may be replaced by a spring such as 8A arranged as in Fig. 5, if the additional thickness caused thereby be not objectional. Similarly, either of the detents 13 or 15 may engage the ring 3 or primary wheel 2 by pins or projections on the face of the ring or wheel.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A torque transmitting means comprising a driving member in the form of a gear wheel; a driven member comprising a primary wheel in the form of a toothed wheel having teeth cut away to shorten them radially in such manner that in certain angular positions of said primary wheel its teeth are just clear of the teeth of the driving wheel but in other angular positions are engaged with the teeth of the driving wheel, and an auxiliary toothed element attached to said primary wheel and pivotally movable relatively thereto from a drive-interrupting to a drive-receiving position, the auxiliary element being free of the teeth of the driving wheel in the drive-interrupting position but, in the drive-receiving position, presenting teeth adapted to engage with the teeth of the drive wheel in those angular positions of the primary wheel in which the teeth of the primary wheel are clear of the teeth of the driving wheel; and means for selectively moving said auxiliary toothed element relative to said primary wheel from a drive-interrupting position to a drive-receiving position and from a drive-receiving position to a drive interrupting position.

2. A torque transmitting device as in claim 1, and including a spring between the primary wheel and the auxiliary element tending to turn the auxiliary element into the drive-receiving position.

3. A torque transmitting means as in claim 1, including a first detent for holding the auxiliary element in drive-interrupting position, a check detent for preventing turning of the primary wheel and means for successively disengaging the first detent and the check detent.

4. A torque transmitting device comprising a driving member in the form of a gear wheel; a driven member comprising a primary element in the form of a gear wheel and an auxiliary element also in the form of a gear wheel, means for mounting the auxiliary wheel coaxially with the primary wheel so as to be capable of limited rotation relative thereto by an amount equal to the pitch of the teeth, from a drive-interrupting to a drive-receiving position, the teeth of the primary and auxiliary wheels being similar, partially shortened radially, so that in certain angular positions of the primary element, with the auxiliary element in drive-interrupting position, both these elements have their teeth free of the teeth of the driving wheel, while with the auxiliary element in drive-receiving position, teeth of one or the other of these elements engage with the teeth of the driving wheel; and means for effecting the limited rotation of said auxiliary element relative to said primary element.

5. A torque transmitting device as in claim 4, including a check detent to engage the primary wheel to prevent its turning in the sense of the driving wheel and an auxiliary detent to engage the auxiliary wheel to prevent its turning in the opposite sense, the two detents being so located that with both active the primary wheel and auxiliary wheel are held in a relative position in which their teeth are free of the teeth of the driving wheel.

6. A torque transmitting device as in claim 4, in which the auxiliary wheel is in the form of a ring and the primary wheel has a hub on which the ring is mounted to turn from drive-interrupting to drive-receiving position, said hub being formed with an internal annular channel, and a spring inside the channel having one end bearing against the auxiliary wheel and the other end bearing against the primary wheel so as to tend to turn the auxiliary wheel to the drive-receiving position.

7. A torque transmitting device as in claim 4, the teeth of the primary wheel and auxiliary wheel being inclined from one top corner above the pitch line to the opposite top corner below the pitch line so that the inclinations of adjacent teeth are opposite and of alternate teeth are similar.

8. A torque transmitting means composed of disengageable and engageable drive and driven parts, the drive part comprising a drive gear wheel, the driven part comprising a rotatable, driven gear wheel having peripheral teeth demeshed from the drive gear in the disengaged relation of the drive and driven gears, the driven part further comprising an auxiliary toothed element coaxially mounted for angular movement relative to the driven gear wheel from a first position in which the toothed element is demeshed from the drive gear wheel to a second position in which the toothed element is meshed with and actuated by the drive gear wheel to impart rotational movement to the driven gear wheel for meshing the peripheral teeth of the latter wheel with the drive gear wheel for continued rotation by the drive gear wheel, and means for moving the toothed element from the first to the second position to effect such engagement of the drive and driven parts and for moving the toothed element back to its first position to effect the disengagement of the drive and driven parts.

9. A torque transmitting means comprising a drive gear wheel; a driven composite gear wheel including paired coaxial toothed elements having all their teeth clear of the drive gear wheel in disengaged position, means mounting one of said elements for angular movement relative to the other of said elements, from a disengaged position into tooth-meshing engagement with the drive wheel and thereby to couple the composite gear wheel to the drive gear wheel for actuation thereby into a continuous meshing relation with the drive gear wheel wherein the teeth on both of said elements coact with the teeth of the drive gear wheel to provide a continuous drive from the drive gear wheel to the driven composite gear wheel until said movably mounted element is returned to its disengaged position; and means for effecting the movement of said one said elements relative to said other of said elements from a disengaged position into tooth meshing engagement with the drive gear wheel.

10. A torque transmitting means comprising a drive gear wheel; a driven composite gear wheel including a primary toothed element and an auxiliary coaxial toothed element mounted for limited angular movement relative to the primary element from a disengaged position to an engaged position in which it is in drive-transmitting engagement with the primary element, both elements having their teeth clear of the drive wheel in the disengaged position with the primary element presenting teeth drivable by the teeth of the drive wheel but spaced apart twice the pitch so as to be clear of the teeth of the drive wheel, and said auxiliary element upon being moved to the engaged position presenting a drivable tooth at a pitch distance from each drivable tooth of the primary element, so as to engage the composite driven gear wheel with the drive gear wheel; and means for moving said auxiliary toothed element relative to said primary toothed element from the disengaged position to the engaged position.

11. A torque transmitting means including a drive gear; a composite gear comprising a pair of coaxial toothed wheels each having teeth drivable by the drive gear in a rotative direction but spaced apart at least twice the pitch distance, means for mounting the pair of toothed wheels for relative, limited rotational displacement from a disengaged position, in which their drivable teeth are aligned to form a composite set of drivable teeth spaced apart at least twice the pitch distance and out of the driving range of the drive gear, to an alternative, engaged position in which the drivable teeth of one of said toothed wheels are interspersed between the drivable teeth of the other wheel so as to form a composite set of drivable teeth at pitch distance spacing and in mesh with the drive gear for rotation thereby; and means for imparting the limited relative rotational displacement to said pair of toothed wheels.

12. A torque transmitting means comprising a driving gear and a composite driven gear; including paired concentrically mounted peripherally toothed elements each having alternate teeth of a first partially complete tooth configuration and intermediate teeth of a second partially complete tooth configuration, the first and second tooth configurations being complementary portions of the complete tooth configuration, one of said paired toothed elements being mounted for limited rotational displacement relative to the other of said paired elements from a drive-engaging to a drive-disengaging position, the paired elements in the drive-disengaging position having their respective teeth of like configuration aligned to present a composite incomplete tooth configuration incapable of effective mesh with and drive by the driving gear, said elements in the drive-engaging position having their respective like configuration teeth out of alignment and their respective unlike configuration teeth in alignment to provide successive composite teeth of complete tooth configuration meshed with the driving gear, whereby the driving gear effects the rotation of the composite driven gear; and means for imparting the limited rotation of said one of said paired elements relative to said other of said paired elements.

13. A torque transmitting means comprising a drive gear wheel; a driven member including a pair of coaxial gear wheels mounted for limited relative rotation and having teeth which are so formed and arranged that when one of said gear wheels is moved to one position relative to the other gear wheel an engagement is effected between the teeth of said driving gear and the teeth of one of said gear wheels, and when said one of said gear wheels is moved to another position relative to said other gear wheel a disengagement is effected between the teeth of said driving gear and the teeth of one of said gear wheels; and means for selectively effecting a movement of said one of said gear wheels to either of said positions.

JAMES LAST.

REFERENCES CITED

The following references are of record in the file of this patent:

UNITED STATES PATENTS

| Number | Name | Date |
|---|---|---|
| 629,027 | Brown | July 18, 1899 |
| 1,240,126 | Dubois | Sept. 11, 1917 |
| 1,354,717 | Bertels | Oct. 5, 1920 |
| 2,163,277 | Hartmann | June 20, 1939 |